United States Patent [19]

Hareng et al.

[11] 4,413,885
[45] Nov. 8, 1983

[54] ELECTRO-OPTICAL DISPLAY DEVICE

[75] Inventors: Michel Hareng; Jean-Pierre Huignard; Serge Le Berre, all of Paris, France

[73] Assignee: Thomson-CSF, Paris, France

[21] Appl. No.: 120,319

[22] Filed: Feb. 11, 1980

[30] Foreign Application Priority Data

Feb. 13, 1979 [FR] France ................................ 79 03636

[51] Int. Cl.³ .......................... G02F 1/135; G02F 1/03
[52] U.S. Cl. ..................................... 350/342; 350/345; 350/352; 350/393
[58] Field of Search ............... 350/342, 352, 388, 337, 350/393, 3.63, 356, 334, 332, 162 S, 339 F, 345; 365/108–109, 110, 112; 358/236; 340/783; 250/213 R, 484

[56] References Cited

U.S. PATENT DOCUMENTS

| 3,687,535 | 8/1972 | Heurtley | 350/162 SF |
| 3,705,310 | 12/1972 | Wild | 350/393 |
| 3,744,879 | 7/1973 | Beard et al. | 350/162 SF |
| 3,829,684 | 8/1974 | Assouline et al. | 350/342 |
| 3,989,356 | 11/1976 | Altman | 350/331 R |
| 4,051,465 | 9/1977 | Brody | 365/112 |

OTHER PUBLICATIONS

Meitzler et al., "Image Storage and Display Devices Using Fine-Grain, Ferroelectric Ceramics", Bell System Tech. Jr., 7, 8–1970, pp. 953–966.
Fleisher et al., "Radiation Controlled Radiation Gate", IBM Tech. Disc. Bull. 8–1963, pp. 73–74.

*Primary Examiner*—William H. Punter
*Attorney, Agent, or Firm*—Oblon, Fisher, Spivak, McClelland & Maier

[57] ABSTRACT

An electro-optical display device which comprises a twisted nematic liquid crystal layer and a photo-conducting layer. Two crossed electrode assemblies allow the liquid crystal to be made transparent at the points to be displayed. The light which passes at these points makes the photo-conductor conducting which applies the whole of the voltage to the liquid crystal and gives greater rapidity of inscription and a memory effect.

4 Claims, 3 Drawing Figures

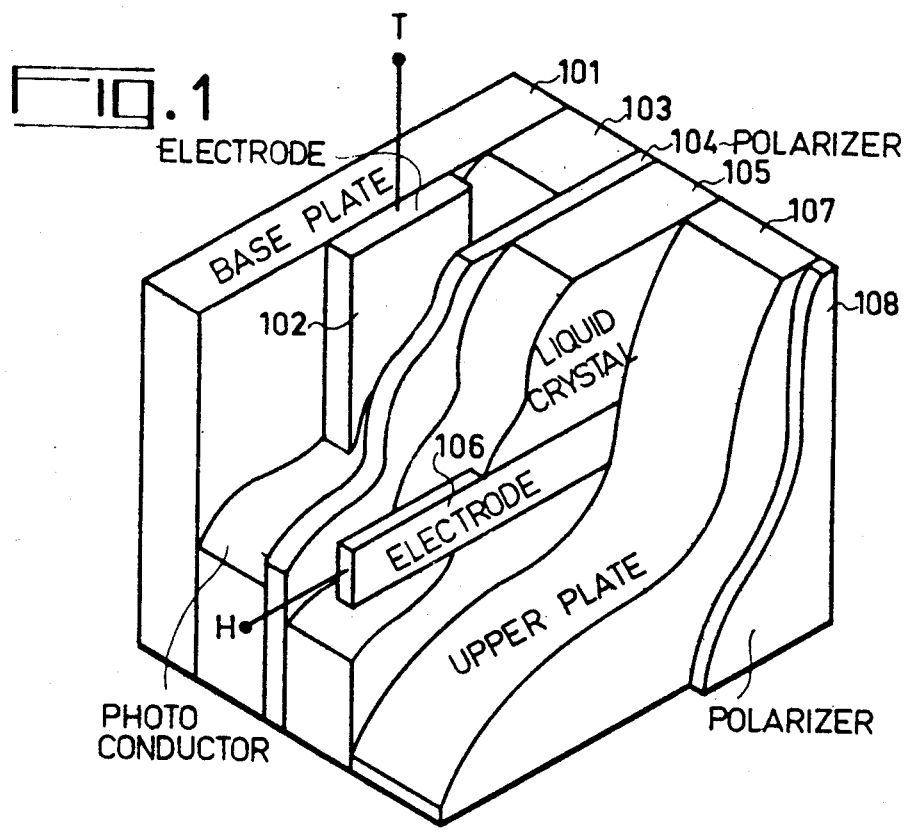
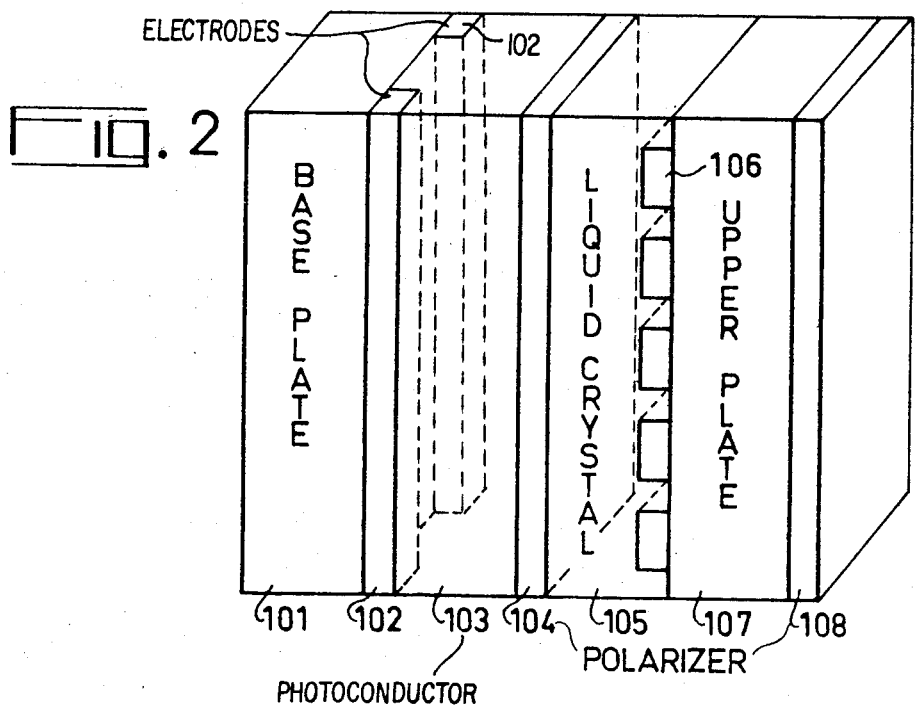

ELECTRO-OPTICAL DISPLAY DEVICE

BACKGROUND OF THE INVENTION

The present invention relates to electro-optical display devices in which a material whose optical aspect changes under the action of an electrical voltage is disposed in a thin layer between two electrodes. By applying between the two electrodes an electrical voltage, the material changes in aspect at the crossing point of these two electrodes. In the case where matrix selection is used with a material having a threshold effect, the voltages applied to the other electrodes are such that at the crossing point between these two electrodes and the two electrodes selected for visualizing the chosen dot, the potential difference is less than the threshold voltage. Thus only the selected crossing point changes in optical aspect.

Such an addressing device is described in particular in the work entitled "Opto-électronique" by G. Broussaud bearing the reference ISBN: 2-225 3918-6, pages 208 to 210. There will be found in this same work, as an example of a threshold-effect material, nematic liquid crystals operating in the twisted mode and called twisted nematic; see pages 298 to 300.

However in such a twisted nematic crystal device the inscription speed and the contrast are relatively moderate and moreover this device does not comprise an internal memory, which requires a permanent dynamic inscription using the retinal assistance but reduces the maximum possible resolution.

SUMMARY OF THE INVENTION

So as to increase the entry speed and the contrast and to give it an internal memory, the invention provides an electro-optical display device comprising a first layer of inscription material having optical characteristics responsive to the electrical field, at least two electrodes situated respectively on each side of this first layer and enabling an electrical field to be applied in at least one point of the first layer to modify at this point these optical characteristics, and means for letting pass, under the effect of this modification, at this point at least partially an incident light applied to the device on one side of the first layer, which comprises furthermore a second layer of photo-conducting material inserted between the first layer and the electrode situated on the side of the first layer opposite that receiving the incident light; the electrical field applied by the electrodes being formed of a first part applied to the photo-conducting material and a second part applied to the inscription material and the reduction in resistivity of the photo-conducting material under the action of the incident light passing through the point where the electrical field is applied causing a diminution of the first part of this field and a correlative increase of the second part.

The above and other objects, features and advantages of the present invention will become apparent from the following description, given solely by way of non-limiting illustration, when taken in conjunction with the accompanying drawings.

DESCRIPTION OF THE DRAWINGS

FIG. 1 is a view with parts cut away of a visualization cell limited to a single visualization point defined by two electrodes.

FIG. 2 shows in sectional view a visualization cell similar to that of FIG. 1 comprising a set of visualization points defined by two electrode assemblies.

DESCRIPTION OF THE PREFERRED EMBODIMENTS

Figure 3:
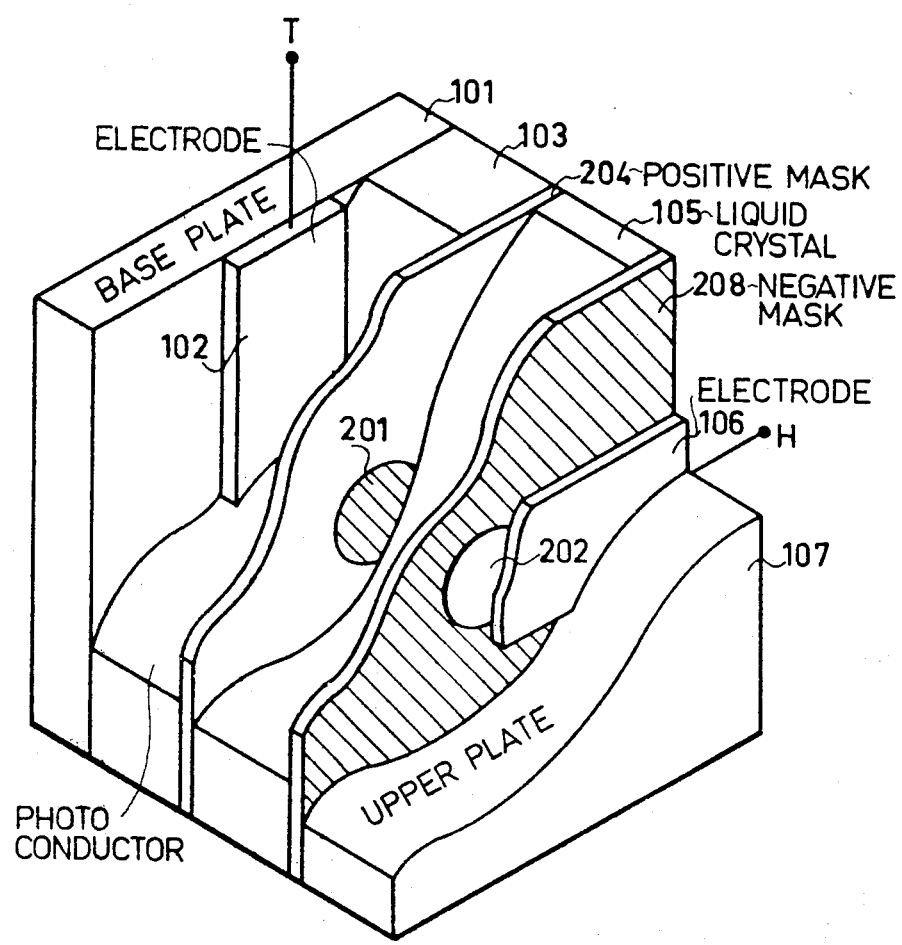
FIG. 3 shows a view with parts cut away of a variation of a visualization cell similar to that of FIG. 1.

FIGS. 1 and 2 show different views of the same cell with the same parts bearing the same references. However so that FIG. 1 is legible, the representation has been limited to a single vertical electrode and a single horizontal electrode.

A base plate 101 serving as a support for the cell supports an assembly of vertical electrodes such as 102. These electrodes are connected to connections T which serve to supply them with external signals. Their surface is reflecting and they are obtained for example by a vacuum deposit of aluminium which is then photoetched in the form of columns.

On these electrodes there is deposited a layer 103 of a mineral photo-conducting material such for example as cadmium selenide CdSe or an organic photo-conducting material such as carbozal polyvinyl (P.F.K.) possibly sensitized in the visible spectrum.

On the photo-conducting layer 103 there is a film of a polarizing material 104. This material polarizes the light which passes therethrough in a definite direction, for example vertically in the figure. Such a material may for example be in thin film form.

On this film 104 there lies a liquid crystal layer 105. This liquid crystal is, at the temperature of use of the device, in the nematic phase. For that a positive dielectric anisotrophy product is used, such as cyano pentyl biphenil which is nematic at normal ambient temperatures. This layer has a sufficient thickness, of the order of a few tens of microns, and is orientated by known processes so that the molecules of the crystal are parallel or perpendicular to the direction of polarization imposed by film 104 in contact with this film, and so that they rotate in the thickness of the layer along a helix so that on the other face of the layer they are orientated perpendicularly to their initial orientation.

In contact with this other face of the liquid crystal layer 105 there is an assembly of transparent horizontal electrodes such as 106. These electrodes are obtained for example by depositing a thin layer of tin oxide. This layer is then photo-etched to form horizontal lines perpendicular to the vertical electrodes 102.

A transparent blade 107 supports this second electrode assembly and confines the liquid crystal layer.

On the outer surface of this transparent blade 107 is deposited a second film of polarizing material 108 orientated in the same direction as film 104.

When an electrical voltage is applied between connections T and H, an electrical field is formed at the crossing point of electrodes 102 and 106 between these latter. The distribution of this field along a line perpendicular to the cell and passing through this crossing point depends on the resistivity and the permittivity of the materials forming layers 103, 104 and 105. For the requirements of the explanation the action of the polarizing layer 104 will be disregarded, the thickness of which is small and the characteristics of which do not vary in accordance with the phenomena which are produced. Under this conditions, the photo-conducting layer 103 is subjected to a fraction of the voltage applied between connections T and H and the liquid chrystal layer 105 is subjected to the other fraction of this voltage. A voltage may nevertheless be chosen such that the fraction applied to the liquid crystal layer is less than the threshold voltage from which the twisted structure of the liquid crystal disappears. For that, if the total voltage is fixed by external parameters, the thickness or the composition of the photo-conducting material 103 may be modified.

The liquid crystal which is thus subjected to a voltage less than this threshold voltage presents a twisted nematic structure which causes rotation of the polarization of the light which passes therethrough. Depending on the orientation of the molecules of the liquid crystal described above for the end faces of the layer of this crystal, the rotation of the polarization plane of the light passing through the layer is equal to $\pi/2$. Thus the incident light which is polarized by the polarizing film 108 in a vertical direction passes through transparent blade 107 without changing polarization, then the liquid crystal layer 105 while undergoing a rotation of the polarization plane by $\pi/2$. On leaving the liquid crystal, the incident light is then polarized horizontally. It impinges then on the polarizing film 104 which is orientated vertically and which absorbs therefore this incident light. Photo-conducting material 103 is therefore not illuminated and its resistivity remains high.

Since the incident light absorbed is not reflected, the cell presents a black aspect.

It will be noted that the voltage applied between connections T and H may be greater than the threshold voltage of the liquid crystal; it may even be, depending on the material chosen and the dimension desired, considerably greater.

By increasing this voltage the fraction applied to the liquid crystal finishes by exceeding the threshold voltage. At that moment, at the crossing point between connections 102 and 106 the liquid crystal loses its twisted structure and therefore no longer presents a rotary power. The polarization plane of the light which passes therethrough at this crossing point is then no longer changed and this light may then pass through polarizing film 104. Thus the photo-conducting material 103 at this crossing point is impinged on by the incident light. Its resistivity decreases therefore. As this resistivity decreases, the distribution of the potential over the path between electrode 102 and electrode 106 is modified so that the fraction of the voltage applied to the photo-conducting material 103 decreases, and so that consequently the fraction applied to liquid crystal 105 increases.

During the transitory conditions which follow the overshooting of the threshold voltage, the passing over of the liquid crystal from the twisted structure to the non-twisted structure is progressive.

The light which then impinges on the photo-conducting material is therefore at the beginning small. It initiates nevertheless the phenomenon of increasing the voltage on the liquid crystal, which results in accelerating the change of structure of the liquid crystal at this point. The light which passes through film 104 becomes then more intense and the photo-conducting material is more energized, which tends to reinforce its drop in resistivity and so the voltage applied to liquid crystal 105. It can then be seen that we thus have an avalanche phenomenon. At the end of this avalanche phenomenon, the greatest part of the voltage applied between the connections T and H is to be found on the liquid crystal. Since photo-conductors are obtainable which have extremely high dynamics, for example 6 orders of magnitude for the CdSe already mentioned, we may consider that it is the whole of the supply voltage which is applied to the photo-conductor. This results in three beneficial effects:

First of all an improvement in contrast. In fact, in the matrix addressing system the maximum usable voltage is limited by the threshold voltage because the points other than those which it is desired to energize must not be energized. Such a limitation does not allow complete removal of the twisted structure of the liquid crystal, and consequently complete transparence at the selected point, to be obtained. In our cell on the other hand, the voltage applied at the selected point at the end of the avalanche phenomenon is substantially equal to the voltage applied to the selection electrodes and, as we have seen, this voltage may be considerably greater than the threshold voltage. Accordingly, the twisted structure of the liquid crystal may be completely removed and an almost perfect transparence obtained.

This increase in the maximum voltage results also in an increase in the switching speed of the selected point. In fact, since the molecules of the liquid crystal are subjected to an electrical field considerably greater than in the usual devices, they will be placed in the non-twisted structure at a much greater speed.

Finally there is obtained an internal memory effect. In fact, when the voltage between the selection electrodes is brought back to the initial voltage, this latter remains applied to the liquid crystal since the photoconductor remains illuminated. Since the rest voltage may be chosen higher, and even much higher, than the threshold voltage, the liquid crystal does not come back to its twisted condition, which allows the incident light to maintain the photo-conductor in a low resistivity condition and so to leave the rest voltage wholly applied to the liquid crystal. To clear the screen either the potential difference applied to connections T and H must then be brought to a value less than the threshold value of the liquid crystal, or the light illuminating the screen must be removed. The clearing time must be greater than the relaxation time of the molecules of the liquid crystal, i.e. some tens of milli-seconds.

In the example described above, support 101 is opaque and visualization is achieved by reflection on electrodes 102 of the incident light penetrating through film 108 and leaving on the same side.

An observation by transmission may be made with a cell in which blade 101 is transparent and electrodes 102 are themselves transparent and in this case made for example from tin oxide. In this case the observation light comes from a source situated on the same side as film 108, passes therethrough, then through blade 107, liquid crystal 105, and photo-conductor 103 and finally exits through blade 101, the observer being situated on the other side of this blade 101. It is however necessary for the ambient light coming from the same side as the observer and which, by passing through blade 101, impinges on photo-conductor 103, not to energize this latter.

The invention is not limited to the embodiment thus described. In particular, when a liquid crystal is used, the other processes of visualization such for example as the use of double refraction or dynamic diffusion may be employed. Materials other than liquid crystals may thus be used such for example as thin-film or electrochromic materials. In the case where the materials used operate by selectively absorbing certain wavelengths of the incident light, with the other wavelengths being permanently transmitted, it is necessary to add to the devices described in FIGS. 1 and 2, a filtering layer which selects in the incident visualization light the wavelengths which will be absorbed or not by the material depending on the signals applied to the control electrodes.

In FIG. 3 there is shown an embodiment of a visualization device reduced to one vertical electrode and one horizontal electrode for the sake of clarity of the drawing corresponding to the use of a liquid crystal in dynamic scattering mode. The general structure of this device is substantially the same as that of the device shown in FIG. 1, and these in FIG. 3 parts identical have the same references. Elements 104 and 106 are not necessary.

In the case of the liquid crystal used in dynamic scattering mode, the visualization light is not properly speaking absorbed by the liquid crystal but it is simply diffused. That is to say that if the light impinges on the liquid crystal at a point on its incident face, it leaves by the exit face along a cone whose apex is the point of incidence. Under these conditions means must be used which allow the non-diffused light to be absorbed and the diffused light not to be so. In fact, so that the photo-conductor changes resistivity under the influence of the diffused light due to the inscription, it must not already be in a conducting condition due to the direct light from outside the inscription.

For that, there is disposed between photo-conductor 103 and liquid crystal 105 a film 204, and between liquid crystal 105 and transparent blade 107 a film 208. These films bear patterns which are negative in relation to each other and which in one case let the light pass at the crossing point of electrodes 102 and 106 and in the other case stop this light from passing. In the embodiment described, film 204 is transparent and comprises at the crossing points of the electrodes opaque disks such as 201, and film 208 is opaque and comprises at the position of these crossing points transparent disks such as 202. Disks 201 and 202 are of the same diameter and are inscribed in the zone defined by the crossing of electrodes 102 and 106. Thus when the liquid crystal is not diffusing, the visualization light which arrives through blade 107 and which is preferably substantially parallel passes through disks 202 and is stopped by disks 201. When on the other hand this crystal has become diffusing, under the control of the voltage applied between connections T and H, the incident light which penetrates through disk 202 is diffused in the liquid crystal before reaching disk 201. Thus, it spreads out in the form of a cone whose outlet section on the face of the liquid crystal which touches film 204 overlaps the surface of disk 201. Thus a part of the diffused light is always intercepted by disk 202, but another part passes beyond this disk and energizes the photo-conductor which is placed therebehind. So that this other part is sufficiently great, the diameter of the disks must be of a size substantially equal to the thickness of the liquid crystal layer. If at that time these disks are too small in relation to the surface covered by the crossing point of the electrodes, several of them may be disposed at this same point. The dot visualized will thus overlap several holes in a way similar to what happens in a color television tube where the cathode spot overlaps several holes of the shadow mask. There will then be observed a luminous spot not by direct return through the point of incidence but obliquely through the holes which surround it.

In a variation, providing more specially observation by transmission, film 204 is removed and disk 201 is etched in electrode 102. Thus the light which passes through disk 202 impinges on the photo-conductor at a position where there is no applied field and so the avalanche effect does not occur at this position. When, on the other hand the liquid crystal is diffusing, the light overlaps a zone of the photo-conductor subjected to the electrical field, and the avalanche is initiated.

Figure 4:
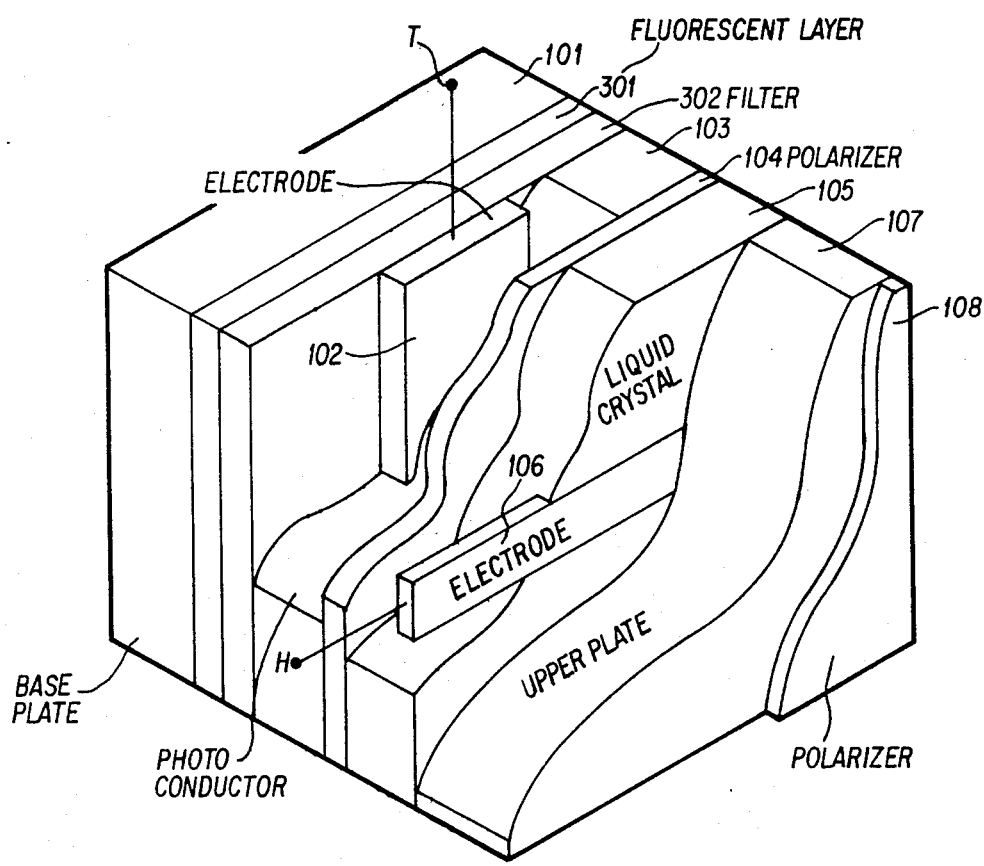
FIG. 4 shows a view with cut away parts similar to FIG. 1 modified to provide transmission with an ambient light capable of energizing the photo-conducting material.

To use the devices thus described by transmission with an ambient light capable of energizing the photo-conducting material, between plate 101 and layer 103 there is inserted a layer of fluorescent material 301 and a filter 302, as shown in FIG. 4. The fluorescent material emits under the effect of the incident light a radiation inactinic for the photo-conducting material and which is perceived by the observer after having passed through the filter. On the other hand, the ambient light does not pass through this filter and does not then energize the photo-conducting material.

It is apparent that within the scope of the invention, modifications and different arrangements can be made other than are here disclosed. The present disclosure is merely illustrative with the invention comprehending all variations thereof.

What is claimed is:

1. An electro-optical display device which comprises:
 a layer of electro-optical material having a first and a second face;
 at least a first electrode on the first face of said layer of electro-optical material;
 a layer of photo-conducting material having a first face facing the second face of said electro-optical material layer and a second face;
 at least a second electrode on the second face of said layer of photo-conducting material, defining with said first electrode at least one point of inscription and
 means for causing to emerge through said second face of said layer of electro-optical material and at said point of inscription an incident light applied to said first face of said layer of electro-optical material when an electrical voltage greater than a given value is applied between said electrode; said light thus emerging at said point of inscription causing the resistivity of said photo-conducting material to drop at said point and thus increasing the effect of said electrical voltage on said layer of electro-optical material, wherein said electro-optical material presents a threshold of sensitivity of the electrical voltage, and the thickness of said layer of photo-conducting material allows an electrical voltage to be permanently applied between said two electrodes which is divided into a first fraction applied to said layer of photo-conducting material; said first fraction being less than said threshold of sensitivity, wherein there is further provided a first plurality of electrodes comprising said first electrode and a second plurality of electrodes comprising said second electrode; said two pluralities of electrodes defining a set of inscription points addressable in a matrix, wherein said electro-optical material is a liquid crystal presenting a twisted nematic structure; said means for causing the light to emerge comprising two polarizing films oriented in the said direction and situated respectively on each side of said liquid crystal layer, wherein a filter is further deposited on said second face of said layer of photo-conducting material to eliminate an external light capable of energizing said photo-conducting material through its second face, and a layer of fluorescent material deposited on said filter to emit under the action of said external light a light inactinic for said photo-conducting material and which passes through said filter to allow visualization by transmission of this inactinic light through the apparatus.

2. An electro-optical display device which comprises:
a layer of electro-optical material having a first and second face;
an array of first electrodes on the first face of said layer of electro-optical material;
a layer of photo-conducting material having a first face facing the second face of said electro-optical material layer and a second face;
an array of second electrodes on the second face of said layer of photo-conducting material, defining with said array of first electrodes a set of inscription points addressable in matrix; said layers forming a sandwich arrangement between said first and second arrays;
means for causing to emerge through said second face of said layer of electro-optical material and at any one of said points of inscription an incident light applied to said first face of said layer of electro-optical material when an external control voltage greater than a given value is applied between those of said first and second electrode crossing each other at said one point; said light thus emerging at said point of inscription causing the resistivity of said photoconducting material to drop at said point and thereby increasing the voltage drop portion of said electrical control voltage across said layer of electro-optical material as a result of the lowering of the voltage drop portion of said external control voltage across said layer of photo-conducting material wherein said electro-optical material presents a threshold of sensitivity to the electrical voltage, and the thickness of said layer of photo-conducting material allows an electrical voltage to be permanently applied between said two electrodes which is divided into a first fraction applied to said layer of electro-optical material and a second fraction applied to said layer of photoconducting material; said first fraction being less than said threshold of sensitivity;
wherein said electro-optical material is a liquid crystal presenting a twisted nematic structure; said means for causing the light to emerge comprising two polarizing films orientated in the same direction and situated respectively on each side of said liquid crystal layer;
wherein a filter is further deposited on said second face of said layer of photo-conducting material to eliminate an external light capable of energizing said photo-conducting material through its second face, and a layer of fluorescent material deposited on said filter to emit under the action of said external light a light inactinic for said photo-conducting material and which passes through said filter to allow visualization by transmission of this inactinic light through the apparatus.

3. An electro-optical display device which comprises:
a layer of electro-optical material having a first and second face;
an array of first electrodes on the first face of said layer of electro-optical material;
a layer of photo-conducting material having a first face facing the second face of said electro-optical material layer and a second face;
an array of second electrodes on the second face of said layer of photo-conducting material, defining with said array of first electrodes a set of inscription points addressable in matrix; said layers forming a sandwich arrangement between said first and second arrays;
means for causing to emerge through said second face of said layer of electro-optical material and at any one of said points of inscription an incident light applied to said first face of said layer of electro-optical material when an external control voltage greater than a given value is applied between those of said first and second electrode crossing each other at said one point; said light thus emerging at said point of inscription causing the resistivity of said photo-conducting material to drop at said point and thereby increasing the voltage drop portion of said electrical control voltage across said layer of electro-optical material as a result of the lowering of the voltage drop portion of said external control voltage across said layer of photo-conducting material wherein said electro-optical material presents a threshold of sensitivity to the electrical voltage, and the thickness of said layer of photo-conducting material allows an electrical voltage to be permanently applied between said two electrodes which is divided into a first fraction applied to said layer of electro-optical material and a second fraction applied to said layer of photoconducting material; said first fraction being less than said threshold of sensitivity;
wherein said electro-optical material is a liquid crystal presenting a twisted nematic structure; said means for causing the light to emerge comprising two polarizing films orientated in the same direction and situated respectively on each side of said liquid crystal layer;
wherein said electro-optical material is a liquid crystal being able to be rendered diffusing under the action of said electrical voltage; said means for causing the light to emerge comprising two opaque masks situated respectively on the first and the second face of said liquid crystal layer and comprising complementary orifices at the position of said inscription points so as to let pass to said photo-conducting material only the incident light diffused by said liquid crystal.

4. A electro-optical display device which comprises:
a layer of electro-optical material having a first and a second face;
at least a first electrode on the first face of said layer of electro-optical material;
a layer of photo-conducting material having a first face facing the second face of said electro-optical material layer and a second face;
at least a second electrode on the second face of said layer of photo-conducting material, defining with said first electrode at least one point of inscription and means for causing to emerge through said second face of said layer of electro-optical material and at said point of inscription an incident light applied to said first face of said layer of electro-optical material when an electrical voltage greater than a given value is applied between said electrode; said light thus emerging at said point of inscription causing the resistivity of said photo-conducting material to drop at said point and thus increasing the effect of said electrical voltage on said layer of electro-optical material, wherein said electro-optical material presents a threshold of sensitivity to the electrical voltage, and the thickness of said layer of photo-conducting material allows an electrical voltage to be permanently applied between said two electrodes which is divided into a first fraction applied to said layer of photo-conducting material; said first fraction being less than said threshold of sensitivity, wherein there is further provided a first plurality of electrodes comprising said first electrode and a second plurality of electrodes comprising said second electrode; said two pluralities of electrodes defining a set of inscription points addressable in a matrix, wherein said electro-optical material is a liquid crystal being able to be rendered diffusing under the action of said electrical voltage; said means for causing the light to emerge comprising two opaque masks situated respectively on the first and the second face of said liquid crystal layer and comprising complementary orifices at the position of said inscription points so as to let pass to said photo-conducting material only the incident light diffused by said liquid crystal.

* * * * *